Aug. 31, 1965     V. L. PEICKII ETAL     3,203,740
BEARING SEAL
Filed April 15, 1963     2 Sheets-Sheet 1

United States Patent Office 3,203,740
Patented Aug. 31, 1965

3,203,740
BEARING SEAL
Vasalie L. Peickii, Hillsborough, and Richard C. Lund
and George D. Rhoads, Redwood City, Calif., assignors
to Federal-Mogul-Bower Bearings, Inc., Detroit, Mich.,
a corporation of Michigan
Filed Apr. 15, 1963, Ser. No. 273,804
4 Claims. (Cl. 308—187.2)

The invention relates to an improved ball-bearing assembly and to an improved lubricant-sealing member for ball bearings. It also relates to a method for making the improved lubricant-sealing member. This application is a continuation-in-part of application Serial Number 98,362, filed March 27, 1961, now abandoned, which was a continuation-in-part of application Serial Number 29,471, filed May 16, 1960, now abandoned.

Many attempts have been made to provide ball bearings that are protected both from entry of foreign matter and from loss of lubricant. Some ball bearings employ a metal shield that is held by the outer race and barely clears a stepped portion of the inner race; but while this expedient is inexpensive, it is far from fully effective, for no attempt is made to provide an actual seal. Somewhat better results have been obtained by employing sealing members with a leather or synthetic rubber lip that wipes the inner race; but the trouble here has been that if the lip is inclined in the proper direction for excluding foreign matter, it is necessarily inclined in the very direction that will permit leakage of lubricant, and vice versa. To solve this problem it has been proposed to use plural lips, but heretofore there have been several objections to the use of plural-lip seals in ball bearings: (1) the use of plural lips has made the seal too wide to be used in most standard ball bearing assemblies; (2) during installation all the lips, in prior-art seals, tended to become inclined in the same direction, so that they did not consistently solve the problem; (3) whether or not the lips consistently reached a predetermined position, they produced a torque or drag which was intolerably large in magnitude and in the amount of variation of magnitude from one seal-bearing combination to another; (4) this torque drag tended to provide a rise in temperature in the bearing during operation; (5) this rise in temperature tended to result in thinning and drainage of the lubricant, in addition to rapid oxidation, and thereby shortened the life of the bearing; and (6) it was difficult to get consistant performance in an inexpensive article.

The present invention solves these problems by providing a novel dual-lip sealing element that cooperates with a novel bearing structure so as to provide effective seals in both directions—one lip sealing the lubricant in, while the other lip excludes the dirt and dust. Moreover, the seal solves the space problem, fitting within the bearing assembly in a space only about $\frac{1}{16}''$ wide. Still further, it solves the torque problem by providing a more effective lip shape and better control.

Thus, one object of the invention is to provide a ball-bearing assembly wherein dirt, dust, water and other bearing-damaging materials are excluded, even under moderately severe conditions such as are met in a hay baler or in a threshing machine.

Another object is to provide a ball-bearing assembly that retains its originally packed-in grease under normal speed conditions. (Some purging of excess grease is desired initially so as to provide lubrication for the outer lip of the seal. This is accomplished simply by adding more than the normal amount of grease. After that there is no leakage.)

Another object of the invention is to provide a seal which is easily installed in a ball-bearing.

A further object is to provide a seal that, when installed, will not rotate with respect to its bore in the outer race, will not permit passage of any material between it and its bore, and will not pop out of place.

Another object of the invention is to provide a ball bearing assembly having the maximum possible interior bearing volume, so that the grease pack may be large enough to insure a satisfactory bearing life. This means that the seal itself should have the minimum volume possible for any given bearing.

Another object is to provide a ball bearing where the seal does not extend beyond the bearing face, being either flush with it or slightly recessed. Achievement of this object not only helps to protect the sealing elements against damage, both when being installed and when being shipped and handled, but also means that a bearing provided with these seals is interchangeable with a bearing having no seal.

A further object is to provide a bearing seal that can be used with existing sizes of standard ball bearings; in other words, one that does not require enlargement of the overall dimensions of the bearing assembly, either in width or in inner or outer diameter. Related to this object is that of providing a bearing seal that achieves greatly improved results while calling for only a minimum amount of change in the design of the bearing assembly itself, all such changes being inexpensive and involving only simple tool revisions of negligible cost and no net increase in the cost of manufacture of the bearing assembly.

Another object of the invention is to provide a seal with sealing lips that require no trimming, buffing, or other special and costly preparation in order to seal properly and to look right.

A corollary object of the invention is to provide a seal free from flash at locations that interfere either with proper sealing or with the good and saleable appearance of the bearing assembly.

Another object is to provide, as one embodiment, a bearing seal having an exterior surface of synthetic elastomer, suitable for the inclusion of identifying symbols and clean and pleasing in appearance, giving an appropriate impression of the professional precision of the article.

With all ball bearing seals there is the problem of how to obtain good sealing action without an undue increase in torque. Hence, an additional object of the invention is to provide a low-torque seal; i.e., one wherein the torque measured at 20 r.p.m. after one minute of operation, and at a bearing temperature of 68° F. does not significantly exceed the product of the outer diameter of the inner race multiplied by 20 ounces, which is a maximum *initial* value. Normally, the torque will decrease rapidly in the first few hours and will decrease gradually thereafter. During the major portion of the life of the seal it will be about the product of the outer diameter of the inner race multiplied by 5 ounces.

A related problem is that of the operating temperature of the seal, since undue friction between the seal and the bearing heats the bearing. If the bearing gets too hot the grease in the bearing will break down. In the present invention the operating temperature of the seal and bearing does not at any time exceed 185° F., and the grease is therefore not induced to break down. Tests indicate that the sealed bearing alone (with no load on it), operates at a temperature well below 125° F. after running for six hours at about 80% of the rated r.p.m. capacity of the bearing.

Another object of the invention is to provide a seal that will consistently accomplish all the above objects through a structure that lends itself to quality control methods.

Other objects and advantages of the invention will appear from the following description of a preferred embodiment presented in accordance with the statutes.

In the drawings:

FIG. 1 is a fragmentary enlarged view in perspective and partly in section of a ball bearing assembly embodying the principles of the present invention and having a seal embodying the principles of the invention installed on one end thereof. Normally, there is also an identical seal installed symmetrically at the other end, but it has been left off in this view to show the bearing structure more clearly.

Figure 1:
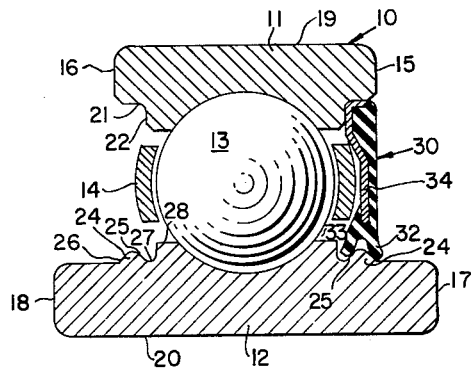

The ball bearing 10 shown in FIG. 1 includes an outer race 11, an inner race 12, a plurality of balls 13 and a ball retainer 14. Both the inner and outer races have smooth end walls 15, 16, 17 and 18, and the outer race 11 has a smooth cylindrical outer periphery 19 while the inner race 12 has a smooth cylindrical inner periphery 20. The outer race 11 is provided with two seal-receiving bores 21, each having a bore end wall 22 that customarily diverges from the radial plane by about 5°.

The inner race 12 is provided with an annular ridge 24 generally opposite each bore 21. Preferably the ridge 24 is not directly opposite the center of the bore 21 but lies slightly outside it; that is, closer to the plane of the end wall 15 (or 16) than does the bore 21, for reasons which will presently appear. The ridge 24 is curved on top and provides inner and outer beveled walls 25 and 26. A rather wide groove 27 separates the ridge 25 from the ball-seating portion 28 of the inner race 12.

A sealing member 30 made according to this invention is pressed into the bore 21 and has two lips 31 and 32, one riding on each of the walls 25 and 26 of the ridge 24 and facing in opposite directions, the inner lip 31 sealing in the grease that is packed into the space 33 not occupied by the balls 13 or ball retainer 14, while the outer lip 32 excludes dirt, dust, and other foreign matter from gaining access to the lubricant 33 and to the balls 13 and the races 11 and 12.

Looking closer at the sealing member 30, it will be seen that it has a reinforcing member 34 comprising a shallow cup-shaped metal stamping with a generally radial flange 35 of considerable extent, and a very short generally axial flange 36 which extends axially outwardly of the bearing 10. Actually the flange 36 is frusto-conical, tapering outwardly about 5°. The radial flange 35 has a radially outer radial portion 37, a radially inner radial portion 38, and a frusto-conical portion 39.

To the stamping 34 is bonded a synthetic rubber member 40 which forms the sealing lips 31 and 32 and a radial cover 41 for the axially outer face 42 of the radial flange 35 bonded to the flange 35 and to the radially inner face of the axial flange 36. The bonding gives support to the lips 31 and 32 and concentricity to the seal 30, both of which are unobtainable in seals made by clamping an elastomeric member to a case.

The two lips 31 and 32 are preferably of the same diameter, although one may be smaller than the other if desired, and they are separated from each other by a groove 43. Sharp and flashless corners 44 and 45 are provided on the lips 31, 32 adjacent to the groove 43, preferably 90° or with as sharp a radius as is physically possible, for these corners 44, 45 perform the sealing action in contact with the ridge walls 25 and 26 of the bearing inner race 12.

Molding flash is permissible at the inner corner 46 but not at the corners 44 and 45 nor the outer corner 47. Molding flash is also not permissible at the radially and axially outer corner 48 but is permissible at the end 49 of the axial flange 36, and tight flash is permissible at the exposed inside surface 50 of the flange 35. The inside surface 50 of the flange 35 and the tapered radially outer face 51 of the flange 36 may be used to locate the metal case 34 in the mold 52 shown in FIG. 4. The groove 43 stops far enough away from the inner end or pierce 53 of the radial flange 35 to allow easy flow of the rubber for filling the inner lip 31 during molding, a diametral difference of about 0.060 inch being adequate for this purpose. It is desirable that the flange 35 extend close to the lips 31, 32 in order to give good support to them.

Figure 4:
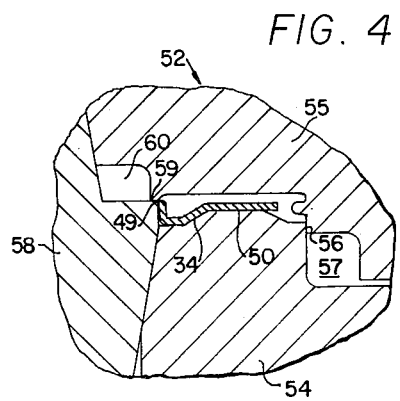
FIG. 4 is a view on a reduced scale in elevation and in section of a portion of a mold in which the sealing element of FIG. 3 is made.
Figure 2:
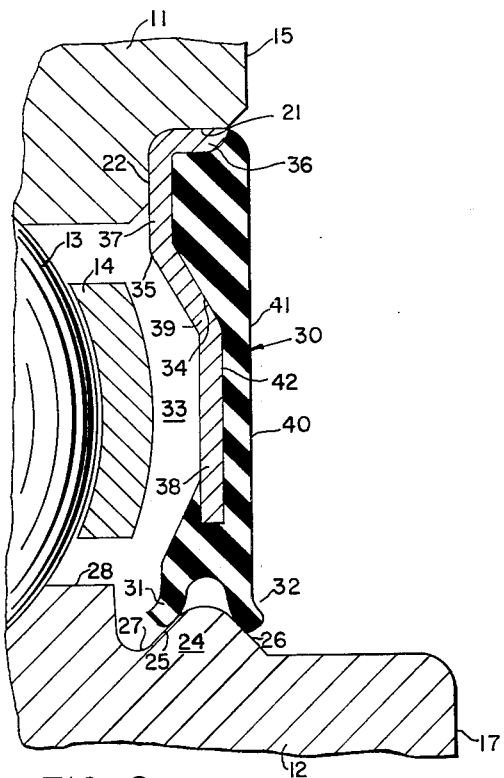
FIG. 2 is a further enlarged fragmentary view in elevation and in section of the right-hand end portion of the bearing of FIG. 1 showing in solid lines the seal in operating position. Broken lines indicate the normal preinstallation shape of the sealing element.
Figure 3:
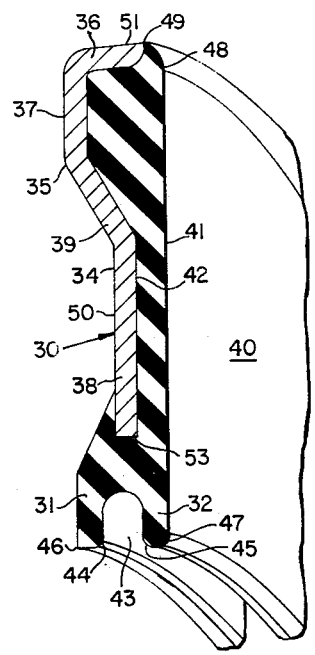
FIG. 3 is a fragmentary view in perspective and partly in section of the sealing element of FIGS. 1 and 2 before its installation into the bearing.

As shown in FIG. 4, the mold 52 includes a lower member 54 that is fully seated against the face 50 except at the radially inner end thereof, an upper member 55 meeting the lower member 54 with a part line 56 (i.e., a place where there can be flash) at the corner 46, the extent of flash being kept small by the short length of the part line 56 leading into a cavity 57, and an annular outer or rim member 58 meeting the upper member 55 at the corner 49 and the lower member 54 at the corner where the portions 37 and 36 meet, so that any flash is formed at a part line 59 at the corner 49 and is kept short by the closely adjoining cavity 60.

Thus the method of making the member 30 comprises molding the elastomer to the case while permitting flash to form only along very short lines at the corners 46 and 49.

In installation, the sealing element 30 is pressed into place in the bore 21. The seal 30 is held in place by interference of the metal portion 36 with the inner wall of the bore. The 5° taper serves to provide press-fit interference which is axially away from the bend joining the portions 36 and 37, thereby counteracting any tendency for the seal to dish axially at its inner periphery.

Since the seal 30 is made in a single molding, there is a fixed relation between the lips 31 and 32 and the bottom of the case member 34 that provides the axial location point for the seal. The accuracy of the axial location of these lips 31 and 32 is therefore dependent only on that of the bearing structure which is customarily quite good. The accuracy of this axial location is quite important in a seal of this type since there is relatively little interference at the lip corners 44 and 45. In most cases it is desirable for the interference at the outer corner 45 to be equal to or slightly more than that of the inner corner 44; in the present invention this relation is controlled by the axial placement of the annular ridge 24.

Radial location is a centering action inherent through the assembly of two concentric objects.

Due to the design of the seal 30 and the ridge 24, the inner lip 31 is deflected inwardly to seal in the grease, and the outer lip 32 is deflected outwardly to seal out foreign matter. When, on installation, the inner lip 31 is forced over the ridge 24, it automatically has to deflect outwardly, but once the outer corner 46 of the lip 31 has gone beyond the crest of the ridge 24 in an axially inward direction, the resilience of the rubber material causes it to attempt to regain its original shape by snapping further inward to the position shown. The purpose of the groove 27 is simply to enable the lip 31 to clear, but it would not really be a groove if its diameter were not smaller than that of the portion 28. The angle of inclination of the surfaces 25 and 26 to the vertical may be varied, but a 45° angle or inclination has been found useful.

The structure of the seal 30 enables it to be made very narrow, the corner 47 lying in the plane of the cover 41 before installation and inwardly from the end wall surfaces 15, 17 or 16, 18 when installed, and the lip corner 47 still not extending beyond those surfaces at any point or time after installation. This helps to prevent accidental damage to the lip during handling or use.

The rubber coating 41 on the surface 37 serves to cover the outer surface 42 of the metal for simplified molding and also to protect it from corrosion, and to provide a clean surface pleasing in appearance, on which identification information may be placed. The inner lip 31 is joined to the case 34 for firm support, the instepping of the case portion 39 preventing excessive width of the seal at the point where the ball retainer 14 is widest.

Adaptation of the bearing 10 to use the seal 30 of this type requires a change only in the configuration of the inner race 12 and a slight change at that, which involves negligible tooling changes, and no change in the cost of the bearing, since this shape may be established by a form tool and need not, in most cases, be ground. An abrasive tumble after machining and hardening is useful to remove burrs or microscopic "tooth" from these surfaces. A smoother surface helps to keep initial seal torque to a minimum and meet the bearing operating temperature and life requirements.

This seal may be made in widths as small as 0.062 inch and is therefore a suitable design for practically any ball bearing needing sealing under moderate conditions.

Figure 5:
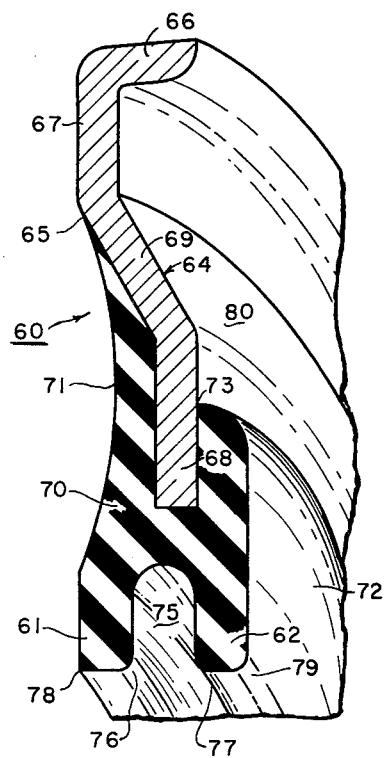
FIG. 5 is a view similar to FIG. 3 of a modified form of seal, also embodying the principles of the invention.
Figure 6:
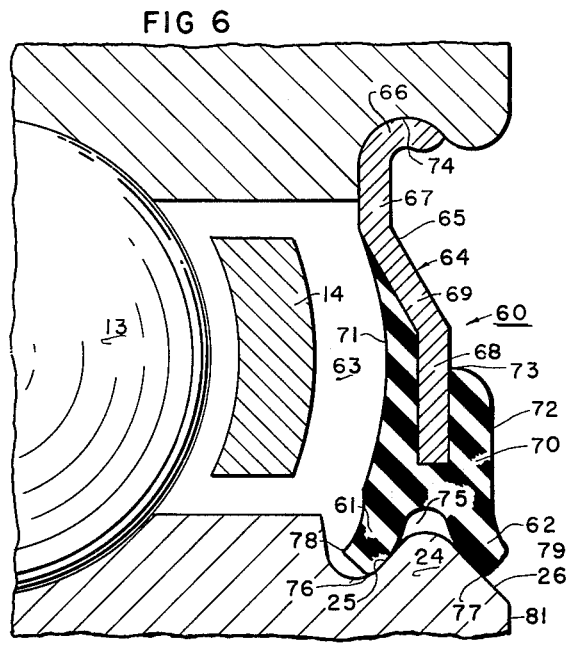
FIG. 6 is a view similar to FIG. 2 incorporating the seal of FIG. 5.
Figure 7:
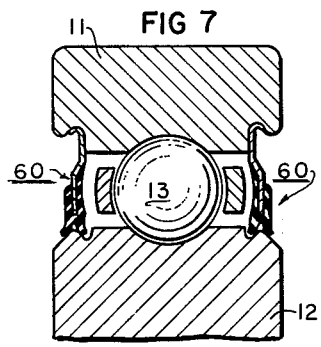
FIG. 7 is a view of a complete ball bearing assembly incorporating the seal of FIG. 5.

The sealing member 60 of FIGS. 5–7 has two lips 61 and 62, one riding on each of the walls 25 and 26 of the ridge 24 and facing in opposite directions. The inner lip 61 seals in the grease that is packed into the space 63 not occupied by the balls 13 or ball-retainer 14, while the outer lip 62 excludes dirt, dust, and other foreign matter from gaining access to the lubricant 63 and to the balls 13 and the races 11 and 12. The sealing member 60 has a reinforcing member 64 comprising a shallow cup-shaped metal stamping with a generally radial flange 65 of considerable extent, and a very short generally axial flange 66 which extends axially outwardly of the bearing. Like the flange 36, the flange 66 is frusto-conical, tapering outwardly about 5°. The radial flange 65 has a radially outer radial portion 67, a radially inner radial portion 68, and a frusto-conical portion 69.

To the stamping 64 is bonded a synthetic rubber member 70 which forms the sealing lips 61 and 62 and is bonded to the flange 65 so as to give support to the lips 61 and 62 and concentricity to the seal 60. The axially inner surface 71 of the member 70 is concave to afford clearance for the convex side of the ball retainer 14. The outer surface 72 stops at an edge 73 near the upper part of the portion 68, leaving the outer surfaces of the portions 67 and 69 free of elastomer. The portion 66 can upon installation be easily formed or spun, as shown in FIG. 6, to fit a conventional bearing groove 74.

Again, the two lips 61 and 62 are preferably of the same diameter, although one may be smaller than the other if desired, and they are separated from each other by a groove 75. Slightly rounded and flashless corners 76 and 77 are provided on the lips 61, 62 adjacent to the groove 75, preferably with as sharp a radius as is physically possible, for these corners 76, 77 perform the sealing action in contact with the ridge walls 25 and 26 of the bearing inner race 12.

Molding flash is permissible at the inner corner 78 and at the outer corner 79 but not at the corners 76 and 77. Molding flash is also permissible at the end 73 of the portion 72, and tight flash is permissible at the end of the concave portion 71. The outside surface 80 of the flange 65 may be used to locate the metal case 64 in the mold.

In installation the sealing element 60 is pressed into place in the groove 74 and held in place thereby. The tapered portion 66 helps in installation and when it is bent into shape the seal 60 is held firmly in place. As shown in FIGS. 6 and 7, the bearing ends at a wall 81 near the end of the ridge 24, and this is a more normal situation than that shown in FIG. 1. The need for a compact seal also is even more pressing than in the bearing 10 of FIG. 1, and the invention provides that compactness. Once again accuracy and concentricity are insured, and the narrow seal effectively seals in lubricant while sealing out dirt.

To those skilled in the art to which this invention relates, many additional changes in construction and widely differing embodiments of the invention will suggest themselves without departing from the spirit and scope of the invention as defined in the claims.

What is claimed is:

1. In a ball bearing assembly having an outer race with inner and outer surfaces, an inner race with inner and outer surfaces, balls between said races, and a ball retainer also between said races, the combination therewith of an annular ridge on the outer surface of said inner race providing a larger diameter circular portion between two portions of smaller diameter, said inner surface of said outer race having a seal-receiving portion generally opposite said ridge, and a lubricant retainer having a shallow cup-shaped reinforcing ring of metal with a long radially extending flange and a short radially outer axially outwardly extending flange with a free edge, seated in said seal-receiving portion, and an elastomeric member bonded to said ring and having a pair of lips on the inner periphery engaging opposite sides of said ridge in a rotary sealing engagement therewith and flexed by said ridge axially away from each other said lips being separated by a groove, the other edge of said reinforcing ring being seated in said elastomeric member radially with the axis of said groove.

2. A lubricant retainer, comprising a shallow cup-shaped reinforcing ring of metal with a long generally radial flange and a short radially outer generally axial flange with a free edge, and an elastomeric member bonded to said radial flange and having a pair of radially extending sealing lips on the inner periphery separated by a radial groove the other edge of said reinforcing ring being seated in said elastomeric member radially with the axis of said groove.

3. A lubricant retainer, comprising a shallow cup-shaped reinforcing ring of metal with a long generally radial flange and a short radially outer generally axial flange with a free edge, said radial flange having inner and outer radial planar portions connected by a frusto-conical portion extending axially in the same direction as said generally axial flange, and an elastomeric member bonded thereto and covering the side of said radial flange on the same side as said axial flange with a planar portion and having an outer peripheral portion meeting the free edge of said axial flange flush therewith, said axial portion having a frusto-conical outer periphery diverging outwardly toward said free edge at about 5°, and a pair of sealing lips on the inner periphery, each lying in a radial plane, one coplanar with said planar portion, the other coplanar with said outer radial planar portion of said radial flange said lips being divided by a groove in line with said inner radial planar portion, said lips having flash-free sharp inner corners on the opposite sides of said groove.

4. The retainer of claim 3 wherein the flash of said elastomeric portion is confined to the outer corner of the lip coplanar with said outer radial planar portion and to the meeting with said free edge of said generally axial flange.

References Cited by the Examiner

UNITED STATES PATENTS 1,560,669  11/25  Dennedy _____ 277—95 X
1,731,958  10/29  Wickstrom _____ 277—95 X (Other references on following page)

UNITED STATES PATENTS

| | | | |
|---|---|---|---|
| 2,173,250 | 9/39 | Fay | 308—187.2 X |
| 2,878,084 | 3/59 | Bermingham | 308—187.1 |
| 2,915,345 | 12/59 | Workman | 308—187.2 |
| 3,014,768 | 12/61 | Dickinson | 308—187.2 |
| 3,032,346 | 5/62 | Sullivan | 277—168 |

FOREIGN PATENTS

| | | |
|---|---|---|
| 1,178,954 | 7/55 | France. |
| 546,260 | 7/42 | Great Britain. |
| 581,232 | 10/46 | Great Britain. |

DON A. WAITE, *Primary Examiner.*

ROBERT C. RIORDON, *Examiner.*